United States Patent Office 3,158,615
Patented Nov. 24, 1964

3,158,615
STABILIZED POLYMERIZABLE VINYL PYRIDINES
Jesse T. Dunn, Charleston, and David T. Manning, South Charleston, W. Va., assignors to Union Carbide Corporation, a corporation of New York
No Drawing. Filed July 20, 1960, Ser. No. 43,994
9 Claims. (Cl. 260—290)

This invention relates, in general, to stabilized polymerizable compounds. In one aspect, this invention relates to stabilized polymerizable heterocyclic nitrogen compounds and a process for effecting the stabilization.

A major problem attending the manufacture of vinylpyridine compounds is the tendency for such compounds to undergo polymerization during refinement, or during storage. This polymerization, which occurs slowly during storage at low temperatures, is greatly accelerated at the elevated temperatures involved during refinement by distillation. The formation of any polymer is undesirable for several reasons; first there is a direct loss of the vinylpyridine compound itself to the useless polymer, second, the contamination of the vinylpyridine compound by its polymer may interfere with its use as a reactive monomer or as a chemical intermediate, third, the presence of a solid polymer in the vinylpyridine compound can plug the reaction system, thus hindering the manufacturing process with costly delays, and fourth, polymerization during refinement of a vinylpyridine compound by fractional distillation tends to cause further polymerization due to the increased kettle temperature required, especially during the final stages of distillation.

It is known that the polymerization of a vinylpyridine compound, such as 2-methyl-5-vinylpyridine, may be easily controlled during storage at low or ambient temperatures by the use of conventional phenolic and aromatic amine-type inhibitors, such as hydroquinone, hydroquinone monomethyl ether, tertiary butyl catechol, and the like. However, such inhibitors are relatively ineffective at the higher temperatures encountered in fractional distillation. Although the inhibitors of this invention, as hereinafter defined, are useful as stabilizers for vinylpyridines during storage, they are particularly useful in preventing polymer formation at the higher distillation temperatures encountered in purifying vinylpyridines.

In the synthesis of 2-methyl-5-vinylpyridine from 2-methyl-5-ethylpyridine efforts to control polymerization during the distillation of the vinylpyridine product are rendered especially difficult for two reasons: first, the boiling points of the two main constituents of the crude mixture, that is of the 2-methyl-5-vinylpyridine (99° C. at 50 mm.) and the 2-methyl-5-ethylpyridine (94° C. at 50 mm.), are sufficiently close to each other so as to require a slow fractionation through a highly efficient still system, and second, the higher boiling point of the easily polymerized vinylpyridine causes its accumulation in the kettle thereby increasing its rate of polymerization during the later stages of distillation. Therefore, it is important to have inhibitors capable of effectively stabilizing the vinylpyridine compound during the refinement process as well as during storage at lower temperatures.

Accordingly, one or more of the following objects will be achieved by the practice of the instant invention. It is an object of this invention to provide stabilized polymerizable heterocyclic nitrogen compounds, particularly the vinyl-substituted heterocyclic nitrogen compounds. It is also an object of this invention to provide stabilized compositions of matter comprising polymerizable vinyl-substituted heterocyclic nitrogen compounds wherein polymerization is retarded at temperatures as high as the boiling point of the polymerizable compound. A further object of the present invention is to provide stabilized polymerizable heterocyclic nitrogen compounds which contain an effective stabilizing amount of an aromatic thiol. Another object of the present invention is to provide stabilized polymerizable heterocyclic nitrogen compounds which contain an effective stabilizing amount of an aromatic polysulfide. A further object of the present invention is to provide a method of stabilizing polymerizable heterocyclic nitrogen compounds by admixing with said compounds an effective stabilizing amount of an aromatic thiol. Another object of the present invention is to provide a method of stabilizing polymerizable heterocyclic nitrogen compounds by admixing with said compounds an effective stabilizing amount of an aromatic polysulfide. These and other objects will readily become apparent to those skilled in the art in the light of the teachings herein set forth.

A broad aspect of this invention is directed to stabilized polymerizable vinyl-substituted heterocyclic nitrogen compounds which contain an effective stabilizing amount, sufficient to stabilize the vinyl-substituted heterocyclic nitrogen compound, of an aromatic sulfur compound which is a member selected from the class consisting of aromatic thiols and aromatic polysulfides.

The term "aromatic" as employed throughout the specification and appended claims refers to a substituted or unsubstituted mononuclear, polynuclear or heterocyclic group and includes, among others, such groups as phenyl, naphthyl, o-aminophenyl, p-nitrophenyl, nitrotolyl, o-carboxyphenyl, tolyl, xylyl, pyridyl, quinolyl, pyranyl, thiadiazoyl, and the like.

Among the substituents which can be present on the aromatic group without detracting from their effectiveness in accomplishing the objects of the invention are nitro, amino, alkylamino, dialkylamino, hydroxyl, alkoxy, aryloxy, mercapto, alkylmercapto, arylmercapto, carboxyl, carboalkoxy, carboaryloxy, formyl, nitroso, hydrazino, hydroxylamino, alkyl aryl, alkaryl, and the like radicals. Hereinafter, the terms mononuclear, polynuclear and heterocyclic aromatic groups are employed to include substituted as well as unsubstituted groups.

The polymerizable heterocyclic nitrogen compounds which are inhibited against polymerization in accordance with the process of this invention include, among others, the polymerizable heterocyclic nitrogen compounds of the pyridine and quinoline series and particularly the nuclear alkyl-substituted derivatives, and mixtures thereof. The vinyl-substituted compounds, especially those containing, in addition to the vinyl group, an alkyl group on the ring are particularly amenable to the practice of this invention. Typical compounds which can be stabilized in accordance with this invention are, for example, 2-vinylpyridine, 3-vinylpyridine, 2,5-divinylpyridine, 2-methyl-5-vinylpyridine, 2,3,4-trimethyl-5-vinylpyridine, 2-vinyl-5-ethylpyridine, 3,4,5,6 - tetramethyl-2-vinylpyridine, 3-ethyl-5-vinylpyridine, 2,5-divinylquinoline, 1,8-divinylisoquinoline, vinylpiperidine, vinylpyrrole, vinylpyrolidine, and the like.

In one embodiment of the present invention, stabilizers which can be employed for inhibiting polymerization of heterocyclic nitrogen compounds are the aromatic thiols as represented by the general formula:

(I) $\quad R\text{-}(SH)_n$ wherein R represents an aromatic group which is a member selected from the class consisting of unsubstituted and substituted mononuclear, polynuclear and heterocyclic groups, and $n$ is a whole positive integer of from 1 to 4, and more preferably from 1 to 2. Illustrative stabilizers include: p-nitrobenzenethiol, 2-naphthalenethiol, ortho-aminobenzenthiol, ortho-mercaptobenzoic acid, p-chlorobenzenethiol, pentachlorobenzenethiol, 2,4,6-triphenylbenzenethiol, 2-phenanthrenethiol, 2-mercaptopyridine, 8-quinolinethiol, 3,4-toluenedithiol, and the like. Preferred stabilizers are those wherein R contains not more than twenty-four carbon atoms and more preferably not more than twelve carbon atoms.

Also suitable as stabilizers in a second embodiment of this invention are the aromatic polysulfides, as represented by the general formula:

(II) $\quad R\text{—}S_x\text{—}R$ wherein $(x)$ is an integer having a value of from 2 to about 12, or higher, preferably from 2 to about 6; and R represents substituted or unsubstituted aromatic groups as hereinbefore indicated. The term "polysulfide" is employed herein to include the disulfides as well as in its more customary usage to include compounds containing more than two sulfur atoms. Examples of such inhibitors are those wherein R is phenyl, naphthyl, phenanthranyl, anthranyl, pyridyl, quinolyl, thiophenyl, furanyl, and the like, and need not be the same throughout the molecule. For example, such compounds would include bis-2-naphthyltetrasulfide, di(orthoaminophenyl) disulfide, poly(thiadiazoyltetrasulfide) and the like.

It has been found that the most effective stabilization is conferred by those compounds in which the sulfur atom or atoms in the mercaptan group or polysulfide group are attached directly to an aromatic ring system or systems, and that maximum stabilizing action is produced when the aromatic group is substituted with groups such as nitro, amino, hydroxyl, alkoxyl, aryoxyl, mercapto, carboxy, carbalkoxy, formyl, acyl, halogen, phenyl, naphthyl, biphenyl, anthranyl radicals and the like. Thus, in order to achieve maximum stabilizing action, it is an essential limitation of this invention that the sulfur atom must be attached directly to the ring system of a cyclic group. It has also been found that the necessary ring substitution to provide maximum stabilization can be supplied by fusion of the benzene nucleus, to which the sulfur is attached, with an additional aromatic ring or system so that the whole constitutes a polynuclear aromatic thiol. Examples of such are the thiols of naphthalene, anthracene, phenanthrene, pyrene, chrysene, and the like and the derivatives of these compounds containing the functional groups enumerated above.

An additional advantage of the aromatic thiols and aromatic polysulfides is their ready solubility in a vinylpyridine mixture which permits feeding them, in solution, down a column during fractionation. In contrast, other known inhibitors such as the ferric halides and the naphthylamine sulfonic acids have low solubility in methylethylpyridine-methylvinylpyridine mixtures and must be suspended in the kettle in the form of fine powders. Sodium polysulfide is added as a water solution during the distillation process and its low solubility in organic substances can be a disadvantage. Similarly, while iodine appears to have a sufficiently high solubility in the methylethylpyridine-methylvinylpyridine mixtures, its rate of solution in the material to be tested is open to question.

An investigation of the aromatic thiol inhibitors as well as the aromatic disulfides and polysulfides was conducted by subjecting them to a refluxing test which simulated actual distillation conditions. The results of a few of the aromatic thiol compounds examined are summarized in the following table to illustrate the extent of the inhibiting effect:

TABLE I

| Aromatic thiol | Percent polymerization of 2-methyl-5-vinylpyridine at 163° C.-138° C. for 6 hrs. |
|---|---|
| Control (no inhibitor) | 74 |
| Para-Nitrobenzenethiol | 17–22 |
| 2-Naphthalenethiol | 21–22 |
| Ortho-Aminobenzenethiol | 15–16 |
| Ortho-Mercaptobenzoic acid | 33–34 |

The amount of stabilizer which can be added is not necessarily critical and all that is needed is a stabilizing amount sufficient to effectively stabilize the heterocyclic nitrogen compound from polymerization. This amount will usually vary from about 0.01 percent to about 3 percent by weight, or higher. Preferably, however, from about 0.1 percent to about 1 percent by weight, based on the weight of polymerizable heterocyclic nitrogen compound to be stabilized, is added. Additionally the amount of stabilizer will vary depending upon the reactivity of the compound being stabilized, and as previously indicated all that is required is a stabilizing amount, sufficient to protect against polymerization.

The compounds of this invention are effective either under anhydrous conditions or in the presence of water. It is not necessary to exclude air completely from methylvinylpyridine during storage when inhibited by these compounds.

In order that those skilled in the art may better understand how the present invention may be carried into effect, the following examples are given to illustrate the best mode presently contemplated for the practice of this invention.

*Example 1*

A solution of 200 grams of freshly distilled 2-methyl-5-vinylpyridine containing 0.4 grams of ortho-aminobenzenethiol (0.2 percent by weight) was heated under reflux at a pressure of 150 mm. in a distillation flask connected to a simple still head. The reflux was continued under a nitrogen atmosphere at 136° C. for a six-hour period at the end of which time the pressure was dropped to 1–2 mm. and the remaining 2-methyl-5-vinylpyridine monomer flashed overhead. In this way, 169 grams of 2-methyl-5-vinylpyridine monomer were recovered as distillate and a residue of only 31 grams (15.5 percent) of polymer remained.

*Example 2*

A solution of 0.4 grams (0.2 percent by weight) of di(ortho-aminophenyl)disulfide in 200 grams of freshly distilled 2-methyl-5-vinylpyridine was refluxed at 137° C. (±1° C.) for six hours as described in Example 1. Upon flash distillation, 171 grams of 2-methyl-5-vinylpyridine were recovered leaving only 29 grams (14.5 percent) of polymer as residue.

*Example 3*

A solution of 0.4 grams (0.2 percent by weight) of para-nitrobenzenethiol in 200 grams of 2-methyl-5-vinylpyridine was refluxed at 137° C. (±1° C.) for six hours under a nitrogen atmosphere. Upon flash distillation, 165 grams of 2-methyl-5-vinylpyridine were recovered leaving only 35 grams (17.5 percent) of polymer as residue.

*Example 4*

The charge described in Example 3 was prepared and refluxed at 108° C. for a 30-hour period. At the end of this time it was found that only 18 percent of the 2-methyl-5-vinylpyridine had polymerized.

*Example 5*

A solution of 0.4 grams (0.2 percent by weight) of 2-naphthalenethiol in 200 grams of 2-methyl-5-vinylpyridine was refluxed at 136° C.–137° C. for six hours under a nitrogen atmosphere. Upon flash distillation, 158 grams of 2-methyl-5-vinylpyridine were recovered leaving only 42 grams (21 percent) of polymer as residue.

*Example 6*

A solution of 0.4 grams (0.2 percent by weight) of poly(thiadiazoyltetrasulfide) in 200 grams of 2-methyl-5-vinylpyridine was refluxed at 136° C. for six hours under a nitrogen atmosphere. 2-methyl-5-vinylpyridine monomer (118 grams) was then removed by flash distillation leaving 80 grams (41 percent) of polymer as residue.

*Example 7*

A solution of 0.4 grams (0.2 percent by weight) of ortho-mercaptobenzoic acid in 200 grams of 2-methyl-5-vinylpyridine was heated under reflux at 138° C. for six hours in a nitrogen atmosphere. Monomeric 2-methyl-5-vinylpyridine (133 grams) was then flash distilled off leaving 67 grams (33.5 percent) of polymeric residue.

*Example 8*

A solution of 0.4 grams (0.2 percent by weight) of 2-mercaptopyridine in 200 grams of 2-methyl-5-vinylpyridine was heated under reflux at 138° C. for six hours in a nitrogen atmosphere. Monomeric 2-methyl-5-vinylpyridine (85 grams) was then flash distilled off, leaving 115 grams (57.5 percent) of polymeric residue.

*Example 9*

A solution of 0.2 grams (0.2 percent by weight) of 3-thiopyrenol in 100 grams of freshly distilled 2-methyl-5-vinylpyridine was heated under reflux at 138° C. for six hours in a nitrogen atmosphere. Monomeric 2-methyl-5-vinylpyridine (82 grams) was then flash distilled off, leaving 19 grams (19 percent) of polymer as residue.

*Example 10*

A solution of 0.4 grams (0.2 percent by weight) of 3,3'-dipyrenyl disulfide in 200 grams of 2-methyl-5-vinylpyridine was heated under reflux at 138° C. for six hours. At the end of this time, monomeric 2-methyl-5-vinylpyridine (175 grams) was removed by flash distilling, leaving 25 grams (12.5 percent) of polymeric residue.

*Example 11*

A solution of 0.4 grams (0.2 percent by weight) of 3,4-toluenedithiol in 200 grams of freshly distilled 2-methyl-5-vinylpyridine was heated under reflux at 138° C. for a period of six hours. At the end of this time, monomeric 2-methyl-5-vinylpyridine (155 grams) was recovered by flash distillation under reduced pressure leaving 45 grams (22.5 percent) of polymeric residue.

*Example 12*

A solution of 0.4 grams (0.2 percent by weight) of 2-phenanthrenethiol in 200 grams of freshly distilled 2-methyl-5-vinylpyridine was heated under reflux at 136–138.5° C. for six hours. Monomeric 2-methyl-5-vinylpyridine (118 grams) was then flash distilled off, leaving 81.5 grams (40.7 percent) of polymeric residue.

For comparison purposes, the same experiment was carried out without the addition of any stabilizers and also with the addition of 0.2 percent by weight of hydroquinone monomethyl ether and 5-amino-1-naphthalenesulfonic acid which are well known conventional stabilizers. The results obtained by the use of the conventional stabilizers are tabulated in Table II with the results of the stabilizers employed in the instant invention.

TABLE II

| Stabilizer | Monomer Recovery | | Polymer Formed | |
|---|---|---|---|---|
| | Grams | Percent | Grams | Percent |
| None | | | | 74 |
| Hydroquinone monomethyl ether | 65 | 32.5 | 135 | 67.5 |
| 5-amino-1-naphthalenesulfonic acid | 95 | 47.5 | 105 | (a) 52.5 |
| Ortho-aminobenzenethiol | 169 | 84.5 | 31 | 15.5 |
| Di (ortho-aminophenyl) disulfide | 171 | 85.5 | 29 | 14.5 |
| Para-nitrobenzenethiol | 165 | 82.5 | 35 | 17.5 |
| Do | 164 | 82.0 | 36 | (b) 18.0 |
| 2-naphthalenethiol | 158 | 79.0 | 42 | 21.0 |
| Poly (thiadiazoyltetrasulfide | 118 | 59.0 | 80 | 41.0 |
| Ortho-mercaptobenzoic acid | 133 | 66.5 | 67 | 33.5 |
| 2-mercaptopyridine | 85 | 42.5 | 115 | 57.5 |
| 3-thiopyrenol | 82 | 82.0 | 19 | 19.0 |
| 3,3'-dipyrenyldisulfide | 175 | 87.5 | 25 | 12.5 |
| 3,4-toluenedithiol | 155 | 77.5 | 45 | 22.5 |
| 2-phenanthrenethiol | 118 | 59.3 | 81.5 | 40.7 |

(a) After only 1.25 hours.
(b) After refluxing at 108° C. for a 30-hour period.

The unexpected improvements achieved are readily evident from the data presented.

Although the invention has been illustrated by the preceding examples, the invention is not to be construed as limited to the materials employed therein, but rather, the invention encompasses the generic invention as hereinbefore disclosed. Various modification and embodiments of this invention can be made without departing from the spirit and scope thereof.

What is claimed is:

1. A composition of matter consisting of a polymerizable vinylpyridine compound and an effective stabilizing amount of para-nitrobenzenethiol.
2. A composition of matter consisting of a polymerizable vinylpyridine compound and an effective stabilizing amount of 2-naphthalenethiol.
3. A composition of matter consisting of a polymerizable vinylpyridine compound and an effective stabilizing amount of ortho-mercaptobenzoic acid.
4. A composition of matter consisting of a polymerizable vinylpyridine compound and an effective stabilizing amount of 2-mercaptopyridine.
5. A composition of matter consisting of a polymerizable vinylpyridine compound and an effective stabilizing amount of 3-thiopyrenol.
6. A composition of matter consisting of a polymerizable vinylpyridine compound and an effective stabilizing amount of 3,4-toluenedithiol.
7. A composition of matter consisting of a polymerizable vinylpyridine compound and an effective stabilizing amount of 2-phenanthrenethiol.
8. A composition of mater consisting of a polymerizable vinylpyridine compound and an effective stabilizing amount of di-(ortho-aminophenyl) disulfide.
9. A composition of matter consisting of a polymerizable vinylpyridine compound and an effective stabilizing amount of 3,3'-dipyrenyl disulfide.

References Cited in the file of this patent
UNITED STATES PATENTS

| 2,458,494 | Durland | Jan. 11, 1949 |
| 2,826,581 | Mahan | Mar. 11 1958 |
| 2,861,997 | Warner | Nov. 25, 1958 |
| 2,862,927 | Snyder | Dec. 2, 1958 |

FOREIGN PATENTS

| 496,966 | Great Britain | Dec. 9, 1938 |

OTHER REFERENCES

Kroger et al.: Chem. Abstracts, vol. 44, col. 1685 (1950).

Sumiki et al.: Chem. Abstracts, vol. 46, col. 7344 (1952).

Bickoff et al.: Chem. Abstracts, vol. 47, col. 829 (1953).